United States Patent
Ueoka et al.

[15] 3,673,119
[45] June 27, 1972

[54] SEMICONDUCTING CERAMIC COMPOSITIONS

[72] Inventors: Hisayoshi Ueoka, Ichikawa-shi; Kazuo Horii, Hunabashi-shi; Kazumasa Umeya, Ichikawa-shi, all of Japan

[73] Assignee: TDK Electronics Co. Ltd., Tokyo, Japan

[22] Filed: Oct. 9, 1969

[21] Appl. No.: 865,031

[30] Foreign Application Priority Data

Oct. 11, 1968 Japan...................................43/73664
Oct. 12, 1968 Japan...................................43/74098

[52] U.S. Cl............................252/520, 252/62.3 BT, 106/39
[51] Int. Cl.......................................H01b 1/06, C04b 35/00
[58] Field of Search......................252/520, 62.3 BT; 106/39

[56] References Cited

UNITED STATES PATENTS 3,292,062  12/1966  Gallagher et al..........................252/520
3,345,188  10/1967  Honma......................................252/520
3,444,101  3/1969   Viernickel................................106/39 R
3,499,772  3/1970   Fujiwara et al..........................106/39 R Primary Examiner—Douglas J. Drummond
Attorney—Wenderoth, Lind & Ponack

[57] ABSTRACT

Ceramic semiconducting compositions are provided herein in which compositions consist primarily of $BaTiO_3$ and minor amounts of $Bi_2O_3$ and $TiO_2$ in the proportions defined in FIG. 1 of the drawings under the Region described by line A-B-C-D-E-F-G and which compositions further contain 0.01 to 4 mol % of $MnO_2$. The disclosure also provides for a method of producing compositions having the aforementioned proportions by mixing the oxides defined by FIG. 1 with $MnO_2$, pressing the ceramic composition into the desired shape and then sintering the compositions in air, followed by reducing the compositions in a reducing atmosphere at elevated temperatures. Ceramics produced from the compositions described above exhibit a large capacitance among other desirably electrical properties and may be conveniently produced in a small compact form.

1 Claim, 4 Drawing Figures

SEMICONDUCTING CERAMIC COMPOSITIONS

DETAILED DESCRIPTION OF THE INVENTION

This invention relates to semiconducting ceramic compositions useful for the production of barium titanate semiconducting capacitors, particularly those capacitors which show very desirable properties when employed as a by-pass capacitor or in various discriminating circuits. In accordance with this invention, the said ceramic compositions consist predominantly of the non-stoichiometric solid solution, prepared from a mixture composed mainly of barium titanate ($BaTiO_3$) and, in minor parts, of suitable amounts of bismuth oxide ($Bi_2O_3$) titanate oxide ($TiO_2$) and manganese (Mn) ions, and which final ceramic product is obtained by firing and reducing the said mixture in a reducing atmosphere.

Although semiconducting ceramic capacitors are a relative new field of invention, it has now been recognized that they are far superior to conventional insulating ceramic capacitors in that they exhibit a large capacitance, are small in size and relatively compact, and exhibit other excellent characteristics. Semiconducting ceramic bodies for capacitors are classified into the valence control type and the oxidation reduction type, according to their composition and the method of production.

The semiconducting ceramic bodies of the valence control type are composed predominantly of barium titanate, to which are added minor amounts of other elements which have an ionic radius similar to those of the constituents of barium titanate and which have a different valency. Since the characteristics of these valence control semiconductors are strongly affected by the purity of the raw materials, the maintenance of the said purity during the manufacturing processes and the necessity of accurately weighing the raw materials in combining them in suitable proportions are critical and it is difficult, if not impossible, to prepare such ceramics on an industrial scale. In fact, it is difficult to prepare such ceramics in the laboratory. In addition, the valence control type compositions have other defects in that their specific resistivity cannot be lowered below 10 $\Omega$-cm with ease, and also their electric properties are limited to the nature of the components which make up the ceramic composition.

On the whole, capacitors of the oxidation reduction type are free from such defects as mentioned above but there are some difficulties in the practical applications of these capacitors. The insulation resistivity of the capacitors of the oxidation reduction type shows a sharp fall when the applied voltage is increased and therefore the working voltage of these materials in usual practical application, according to prior art teachings, is near 10 volts with an upper limit of about 12 volts. Another defect of the capacitors of this type is that their barrier capacitive layers are unstable and and undesirable changes in the electric properties of these materials occurs when lead wires are directly soldered to silver electrodes. To prevent this, lead wires are usually attached to the silver electrodes with conductive adhesives. In practical uses, when the said capacitors are connected in a circuit, their lead wires are heated to an elevated temperature during the soldering processes, which sometimes leads to damage of the conductive adhesives and also to failure in their connections. Particularly, in miniaturized electronic circuits in which lead wires are short, very careful treatment is needed. Such are the reasons why the semiconducting ceramic capacitors of the oxidation reduction type have not been put into practical use although their utility is well recognized in theory. The need for ceramic materials free from the foregoing defects is well known.

It is an object of the present invention to provide ceramic compositions useful for the production of semiconducting barium titanate ceramic capacitors free from the aforementioned defects, that is, semiconducting barium titanate ceramic capacitors which have a much larger capacitance than that of the conventional capacitors of the same dimension and which have a flat temperature dependence of capacitance over an extended temperature range.

A further object is to produce capacitors which show sufficiently high resistivity at an applied voltage higher than that in the case of conventional semiconducting capacitors and thus are capable of being utilized in higher voltage regions.

Another object of the present invention is to produce capacitors which possess a stabilized barrier capacitive layer and are free from the fall of their electrical properties.

Another object is to produce capacitors which are free from defects in their connections at the electrodes, which defects are caused by soldering lead wires directly, thus allowing a remarkable rise of efficiency in the manufacturing of the capacitors and in the process of assembling them in electronic circuits.

BRIEF DESCRIPTION OF THE DRAWINGS

The ceramic compositions of this invention will now be illustrated in connection with the drawings. In FIG. 1, the fundamental constituent $BaTiO_3$ is located at the point (A); the point (B) corresponds to the composition in which $BaTiO_3$ : $Bi_2O_3$ is 99 : 1 in molar ratio; the point (C) corresponds to the composition in which $BaTiO_3$ : $Bi_2O_3$ : $TiO_2$ is 90 : 4 : 6 in molar ratio; the point (D) corresponds to the composition in which $BaTiO_3$ : $Bi_2O_3$ : $TiO_2$ is 82 : 4 : 14 in molar ratio; the point (E) corresponds to the composition in which $BaTiO_3$ : $Bi_2O_3$ : $TiO_2$ is 82 : 2 : 16 in molar ratio; the point (F) corresponds to the composition in which $BaTiO_3$ : $Bi_2O_3$ : $TiO_2$ is 60 : 1 : 39 in molar ratio; the point (G) corresponds to the composition in which $BaTiO_3$ : $TiO_2$ is 60 : 40 in molar ratio. The region of the compositions of this invention is the area surrounded by A-B-C-D-E-F-G and Mn ions of from 0.01 to 4 mol percent with respect to $BaTiO_3$ may be added to the compositions in the said region. The raw materials may be oxides or compounds which give oxides by heating such as carbonates, nitrates, etc. They are weighted and mixed and then sintered in an oxidizing atmosphere. The ceramic bodies thus obtained are reduced and made semiconductive by firing in a reducing atmosphere. The Mn ions may be added in any form such as the sulfates, carbonates or nitrates of Mn. The semiconducting ceramic bodies thus obtained are then equipped with silver electrodes and fired in an oxidizing atmosphere. This final heat treatment simultaneously serves for the plating of the silver electrodes, the surface diffusion of electrode materials and for the partial reoxidation of the surface regions of ceramic bodies. All of the steps described above are the manufacturing methods utilized to produce the semiconducting capacitors of the present invention and are indispensable to provide ceramic bodies with the features and properties previously described.

FIG. 1 is a part of triangular diagram which specifies the ceramic compositions of this invention. The end members of the diagram are $BaTiO_3$, $Bi_2O_3$ and $TiO_2$. This figure gives the compositions solely with respect to the said oxide components, and the Mn and oxygen components are omitted. At the same time, the areas of low $BaTiO_3$ content and high $Bi_2O_3$ content are also omitted. The amounts of the components are given in mol percent. The area surrounded by A-B-C-D-E-F-G is the oxide composition range of this invention and the points I, II and III in the said area correspond with the Examples I, II and III respectively. This invention will be further illustrated by the following examples.

Figure 1:
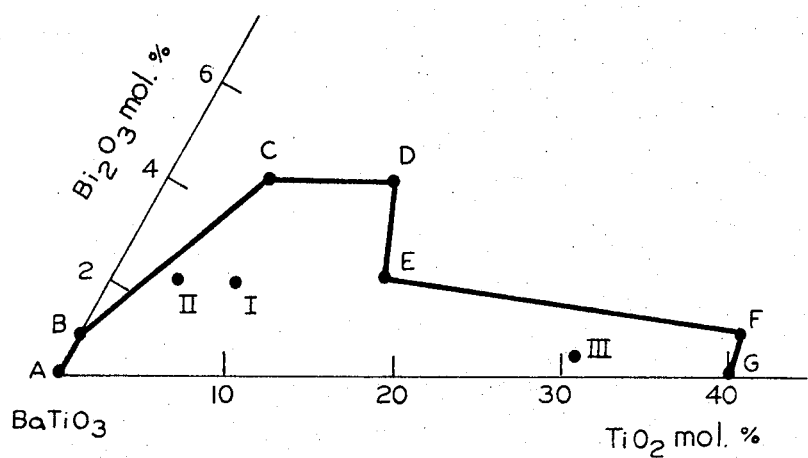
FIG. 1 is a part of the triangular diagram, which shows the range of compositions of this invention.
Figure 2:
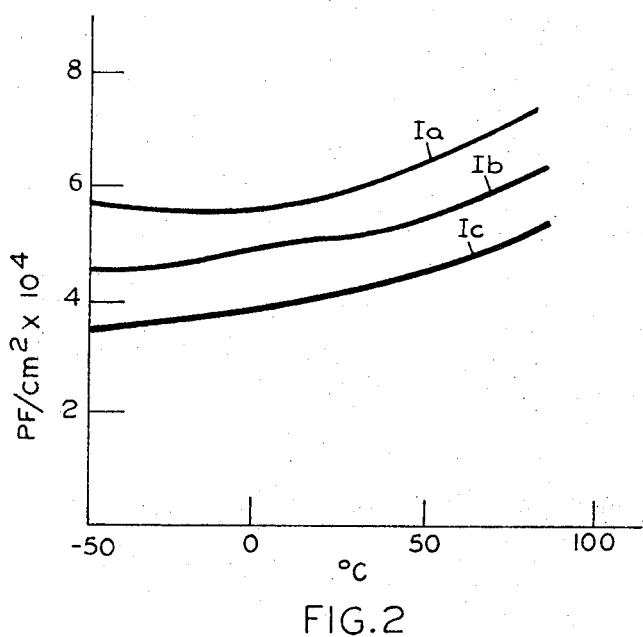
FIG. 2 illustrates graphically the temperature dependence of the capacitance of the capacitors of the compositions of this invention.

EXAMPLE I.

Oxides were employed as the starting materials. They were combined and mixed so as to give the composition $BaTiO_3$ 90.74 mol %, $Bi_2O_3$ 1.85 mol %, $TiO_2$ 7.41 mol %. Parts of the oxides may be replaced by carbonates or other salts. Mn ions were further added to the said mixture in the form of an aqueous solution of manganese sulfate in such amount so that the Mn ion content is about 0.18 mol % with respect to the amount of $BaTiO_3$. Distilled water was then added to the mixture and sufficiently mixed in a ball mill containing a polyethylene lining. The obtained mixture was pressed and shaped into disks of a diameter of 13.8 mm and having a thickness of 0.5 mm under a pressure of 2,000 Kg/cm². The shaped bodies were then sintered at 1,250° C in air for 2 hours and afterward fired at 1,000° C in a hydrogen gas flow for 2 hours. In the latter treatment, the ceramic bodies lose some amount of oxygen and become semiconductive. Then the opposite faces of the obtained semiconductive ceramic bodies were painted with silver electrode paste. These ceramic bodies were heated in air up to about 800° C and thus the painted silver electrode material was affixed on the faces of the ceramic bodies. Finally, lead wires were directly soldered on the surfaces of the silver electrodes by immersing them in fused solder. The characteristic values of the semiconducting ceramic capacitors thus obtained are as follows:

```
Capacitance                -    61000 PF/cm²
tanδ                       -    4.8%
The coefficient of temperature
dependence of electric capacitance
between −50 and +85°C      +25~−8%
(all the above quantities were measured
at 25° C at 1 KH_z)
Insulation resistance           130 MΩcm²
(measured at 25°C under the applied
voltage of 20 volts).
```

EXAMPLE II.

In this example, oxides were used as the starting materials and mixed and combined to form the composition: $BaTiO_3$, 94.23 mol %, $Bi_2O_3$, 1.92 mol %, $TiO_2$, 3.85 mol %. Manganese sulfate was further added to this mixture in such amounts so that the Mn ion content is about 1.0 mol % with respect to the $BaTiO_3$. The method of preparation and other conditions were the same as employed in Example I. The characteristic values of the semiconducting ceramic capacitors thus obtained are as follows:

```
Capacitance                -    52000 PF/cm²
tan δ                      -    4.6%
The coefficient of the temperature
dependence of capacitance between
−50 and +85°C              +25~−11%
Insulation resistance           4000 MΩ/cm².
(all of the above quantities were measured
under the same conditions as employed
in Example I).
```

EXAMPLE III.

In this example, oxides were employed as the starting materials and combined and mixed so as to form the composition: $BaTiO_3$, 69.72 mol %, $Bi_2O_3$, 0.40 mol %, and $TiO_2$, 29.88 mol percent. Manganese sulfate was then added to the mixture in such amounts so that the Mn ion content is about 0.697 mol percent with respect to the mol % of $BaTiO_3$. The method of preparation and other conditions were the same as in Example I. The characteristic values of the semiconducting ceramic capacitors are as follows:

```
Capacitance                -    43000 PF/cm²
tan δ                      -    5.2%
The coefficient of the temperature
dependence of capacitance between
−50 and 85°C               +25~−19%
Insulation resistance           80 MΩ/cm².
(all the quantities were measured under
the same conditions as in Example I).
```

FIG. II graphically illustrates the temperature dependence of the capacitors in the above-mentioned Examples I, II and III. The curves Ia, Ib and Ic correspond with Example I, II and III, respectively. The ordinate denotes capacitance in picofarad per unit area and the abscissa denotes temperature. In every example, a large capacitance and excellent temperature dependence curves are obtained. The excellent properties of the semiconducting ceramic capacitor materials, expressed in Examples I, II and III, and the above descriptions, are attained solely in the compositions described within the area A-B-C-D-E-F-G in FIG. 1. The ceramic compositions of this invention are therefore limited within the said area. Table 1 gives the compositions and the properties of the semiconductor ceramic capacitors prepared from various compositions outside the limited area utilizing the same method of preparation described in Example I.

TABLE 1

| Number of specimen | $BaTiO_3$ (mol. percent) | $Bi_2O_3$ (mol. percent) | $TiO_2$ (mol. percent) | Mn ion (mol. percent) | Capacitance, PF/cm.² | Tan, percent | Insulation resistance (MΩ/cm.²) |
|---|---|---|---|---|---|---|---|
| 1 | 94.23 | 2.89 | 2.89 | 1.0 | 2.1 × 10⁴ | 2 | 3,000 |
| 2 | 87.0 | 4.33 | 8.67 | 1.0 | 0.4 × 10⁴ | 7 | 11,000 |
| 3 | 80.0 | 4.0 | 16.0 | 1.0 | 2.0 × 10⁴ | 23 | 17.3 |
| 4 | 68.5 | 2.0 | 29.5 | 1.0 | 2.5 × 10⁴ | 20 | 24 |
| 5 | 59.52 | 0.8 | 39.68 | 1.0 | 4.5 × 10⁴ | 15 | 70 |

In the region where the $Bi_2O_3$ content is higher than on the line B–C, the sintering temperature rises so remarkably with the increase of the amount of excess $Bi_2O_3$, that dense ceramic bodies cannot be obtained with ease unless a binder is employed. An investigation with the X-ray powder diffraction method has revealed that the ceramic bodies obtained when the $Bi_2O_3$ content is in excess contains free $Bi_2O_3$ in addition to a in addition to a solid solution of barium titanate. Besides this defect, the ceramic bodies with excess $Bi_2O_3$ have a tendency to break off during the treatment to make them semiconductive, thus making it difficult to produce semiconductive ceramics having the desired shape. Particularly, the ceramic bodies of the composition in which the $Bi_2O_3$ is so excessive that it remains in an independent phase, break off so easily that it is impossible to make them semiconductive. Even in the composition region, where the amount of the $Bi_2O_3$ is not so high, the ceramic bodies break if the amount of Mn ion is increased. In the case of the specimen 1 of the Table 1, which retains the shape without breaking off during the heat treatment, the capacitance is quite low, although the insulation resistance still shows a large value.

Thus, this specimen loses a feature of semiconducting ceramic capacitors and is not suited for practical applications. It has been found out that this decrease of capacitance is caused by the fact that the reoxidation during the process of plating electrodes progresses too rapidly in this composition range. This tending to decrease in capacitance is exhibited during the manufacturing process in the composition region where the $Bi_2O_3$ content is greater than that described by the line C–D mentioned above. In some cases, the shape of the ceramic bodies is retained, but even at that time the capacitance of the ceramic bodies becomes quite low, owing to strong reoxidation. Thus, the compositions in the said region, i.e. above the C–D line, are also not suited for practical applications, as illustrated by the specimen 2 in the Table 1. In the compositions about the point D, the existence of another compound $Ba_2Bi_4Ti_5O_{18}$ besides $BaTiO_3$ has been recognized in the case where $Bi_2O_3$ is used in excess of that called for in the present invention. The specimen 3 in the Table 1 is an example of ceramic compositions in the region where the $BaTiO_3$ content is lower than on the line D–E. Such compositions are unsuited for practical applications because of a fall of capacitance and a strong increase in the tanδ value. The region where the BaTiO$_3$ content is lower than on the line D–E is characterized by the existence of the compound Ba$_2$Bi$_4$Ti$_5$O$_{18}$. The coexistence of this compound is accompanied by a sharp increase in tanδ, as illustrated by specimen 4 of Table 1, which is located in the composition region where the Bi$_2$O$_3$ content is in excess of the proportions described by the line E–F. As for the region where the Bi$_2$O$_3$ content is lower than that described by the line E–F, an examination by the X-ray powder diffraction method has revealed that small amount of another compound exists. However, the existence of Ba$_2$Bi$_4$Ti$_5$O$_{18}$ has not been confirmed by this method. In fact, the ceramic body of a composition in this range possesses excellent properties as illustrated in Example III. The properties of the semiconducting capacitors of this invention are not influenced by the existence of small amounts of other compounds and this is one of the surprising features of the capacitors. In the region where the BaTiO$_3$ content is lower than on the line F–G, however, the amount of the other aforementioned coexisting compound becomes so large that the value of tanδ increases, as seen in the case of specimen 5 in Table 1. Thus, ceramic bodies falling within these composition regions are unsuited for practical applications.

From the detailed descriptions given above, it can be concluded that ceramic bodies having excellent characteristics in regard to capacitance, tanδ and insulation resistance can be prepared from compositions containing constituent oxides lying in the area surrounded by A-B-C-D-E-F-G in FIG. 1. Further, it has been discovered that these properties are not lost when a part of the said composition is replaced with a small amount of magnesium titanate, calcium titanate or other double oxides of the ABO$_3$ type.

Figure 3:
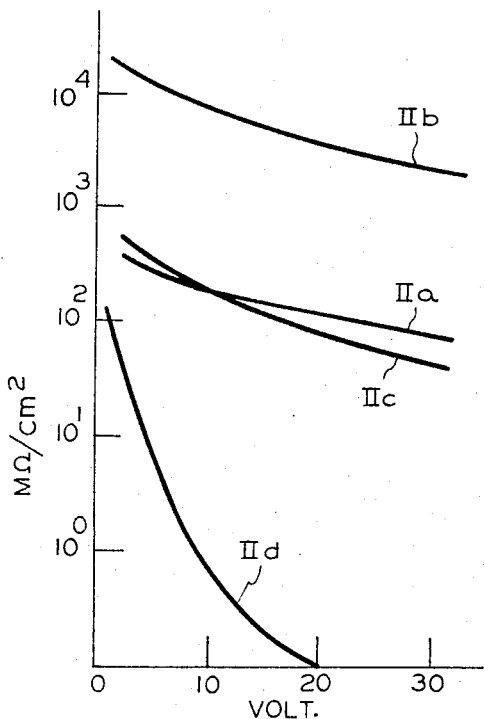
FIG. 3 depicts graphically the relationship between the applied voltage and the insulation resistance of the said capacitors.

The effect of adding Mn ions to compositions within the aforementioned region will now be described. FIG. 3 graphically shows the relationship between the applied voltage and the insulation resistance of the capacitors described in Examples I, II and III. The curves IIa, IIb and IIc correspond with the Examples I, II and III respectively. For the purpose of comparison, a corresponding curve for a semiconducting capacitor prepared by the same method and from the same ceramic composition as described in the Example I except without the addition of Mn ions is also shown in the curve IId. These curves show that the addition of Mn ions produce capacitors having better insulation resistance than compositions wherein Mn ions are left out.

Figure 4:
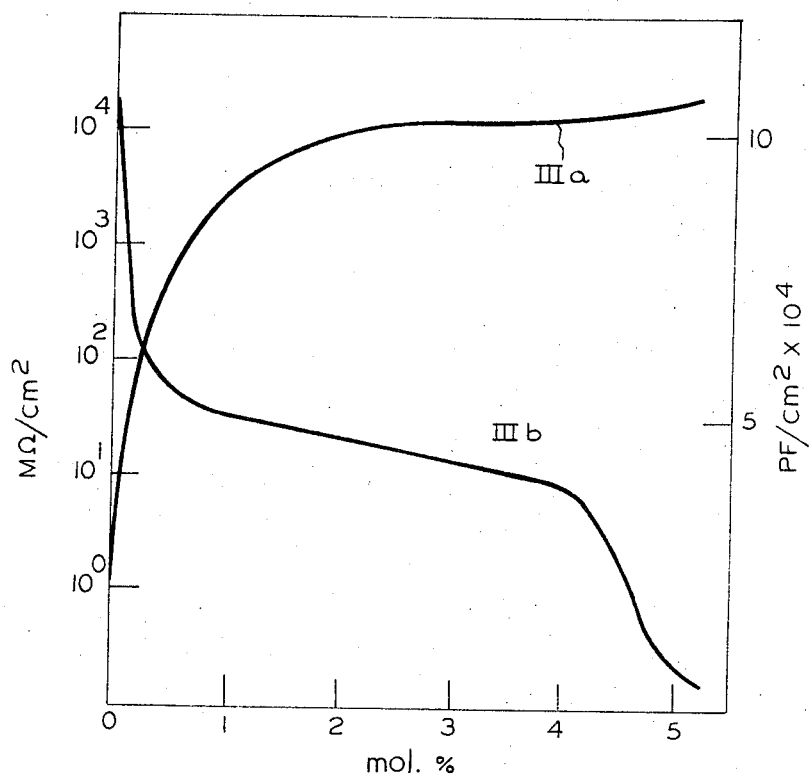
FIG. 4 shows graphically the dependence of the insulation resistance and the capacitance of the said capacitors on the amount of added Mn ions.

FIG. 4 shows the relation between the insulation resistance and the amount of added Mn ions for semiconducting capacitors prepared by the same means and from the same composition as in Example I. The vertical axis on the left side shows the value of the insulation resistance and the one on the right illustrates the value of the capacitance. The curves IIIa and IIIb shows the insulation resistance and the capacitance respectively. As seen from this figure, the addition of Mn ions, even in a small amount, brings about a rapid increase in the insulation resistance. It is thought that this increase is caused by the lowering of the conduction electron density in the barrier layer, owing to the valency compensation effect of Mn ions in the barrier layer.

In the case where the amounts of added Mn ions is less than 0.01 mol percent, the insulation resistance falls below 10 MΩ/cm$^2$ and the improvement of the insulation resistance by the Mn ion addition is ineffective. On the other hand, when the amount of added Mn ions nexceeds 4 mol percent, the capacitance becomes quite small, although the insulation resistance is high. Thus, the possibility of attaining a capacitor having a large capacitance and small size is lost. The effect of the addition of Mn ions described above is similar at any part of the aforementioned composition described by the region A-B-C-D-E-F-G. The amount of Mn ions added to compositions falling within the aforementioned region is limited from 0.01 to 4 mol percent.

As understood from the detailed description given above, ceramic capacitors produced according to the present invention are superior to the capacitors in prior art in several respects. That is, they have a larger capacitance and small temperature dependence of capacitance. In addition, the capacitors show high insulation resistance when voltage is applied, thus being able to be widely employed in the circuits operated at high working voltages. Besides the excellent electric properties mentioned above, the said capacitors may be manufactured efficiently and also electronic circuits utilizing these capacitors may be easily constructed since lead wires can be directly soldered on their electrodes. Thus, miniaturized electronic circuits may be efficiently produced by utilizing capacitors of the present invention.

What is claimed is:
1. Compositions useful for producing semiconducting ceramic capacitors consisting essentially of BaTiO$_3$ with small amounts of Bi$_2$O$_3$ and also TiO$_2$ added thereto, which composition ranges fall within the polygonal area described by the line A-B-C-D-E-F-G in FIG. 1, and in which Mn ions are added to said composition within the range of 0.01 to 4 mol percent.

* * * * *